United States Patent
Sawabe et al.

(10) Patent No.: US 10,868,873 B2
(45) Date of Patent: Dec. 15, 2020

(54) COMMUNICATION SESSION LOG ANALYSIS DEVICE, METHOD AND RECORDING MEDIUM

(71) Applicant: NEC Corporation, Tokyo (JP)

(72) Inventors: Anan Sawabe, Tokyo (JP); Hiroshi Yoshida, Tokyo (JP); Kousuke Nogami, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/348,889

(22) PCT Filed: Nov. 13, 2017

(86) PCT No.: PCT/JP2017/040673
§ 371 (c)(1),
(2) Date: May 10, 2019

(87) PCT Pub. No.: WO2018/092698
PCT Pub. Date: May 24, 2018

(65) Prior Publication Data
US 2019/0281122 A1    Sep. 12, 2019

(30) Foreign Application Priority Data
Nov. 15, 2016 (JP) .................. 2016-222395

(51) Int. Cl.
*H04L 29/08* (2006.01)
*G06F 16/957* (2019.01)
(Continued)

(52) U.S. Cl.
CPC ............ *H04L 67/146* (2013.01); *G06F 11/34* (2013.01); *G06F 11/3452* (2013.01);
(Continued)

(58) Field of Classification Search
CPC ........... H04L 29/08081; H04L 29/0809; H04L 29/08576; H04L 29/08594–08621;
(Continued)

(56) References Cited

U.S. PATENT DOCUMENTS

| 6,535,916 B1* | 3/2003 | Nguyen | G06Q 30/02 |
| | | | 707/E17.109 |
| 8,346,709 B2* | 1/2013 | Silverman | G06Q 30/02 |
| | | | 705/14.49 |

(Continued)

FOREIGN PATENT DOCUMENTS

| JP | 2013-127789 A | 6/2013 |
| JP | 2015-511415 A | 4/2015 |

(Continued)

OTHER PUBLICATIONS

International Search Report for PCT/JP2017/040673 dated Feb. 2, 2018 [PCT/ISA/210].

(Continued)

*Primary Examiner* — Brendan Y Higa
(74) *Attorney, Agent, or Firm* — Sughrue Mion, PLLC

(57) ABSTRACT

In order to provide a communication session log analysis device allowing integration of communication session logs that makes it p to provide web session time with which quality of user experience can be evaluated with high precision, a communication session log analysis device according to the present invention that updates information relating to a web session includes: a web session integration means for integrating, when time elapsed from a start time of a reference communication session to a start time of one communication session is equal to or less than a threshold value, the one communication session into the same web session as the reference communication session, a threshold value setting means for setting the threshold value, based on a predetermined probability distribution, and a filtering (Continued)

means for extracting the web session determined as valid by statistical testing based on statistical information relating to a configuration of the web site.

18 Claims, 15 Drawing Sheets

(51) Int. Cl.
*G06F 11/34* (2006.01)
*G06F 13/00* (2006.01)
*H04L 12/26* (2006.01)

(52) U.S. Cl.
CPC ............ *G06F 13/00* (2013.01); *G06F 16/957* (2019.01); *H04L 29/0809* (2013.01); *H04L 29/08576* (2013.01); *H04L 29/08675* (2013.01); *H04L 43/067* (2013.01); *H04L 43/16* (2013.01); *H04L 67/14* (2013.01); *H04L 67/22* (2013.01)

(58) Field of Classification Search
CPC ....... H04L 29/08675; H04L 41/14–145; H04L 43/00; H04L 43/06; H04L 43/0823; H04L 43/18; H04L 43/50; H04L 67/00; H04L 67/02; H04L 67/144–146; H04L 67/22; H04L 67/14–146; G06F 11/3438–3466; G06F 16/9577–986; G06F 11/34; G06F 11/3419; G06F 11/3476; G06F 16/958–986; G06F 2201/81; G06F 2201/875; G06Q 30/0201
See application file for complete search history.

(56) References Cited

U.S. PATENT DOCUMENTS

| | | | | |
|---|---|---|---|---|
| 2002/0065912 | A1* | 5/2002 | Catchpole | G06F 16/954 709/224 |
| 2010/0306224 | A1* | 12/2010 | Ciemiewicz | G06F 16/951 707/759 |
| 2013/0067109 | A1* | 3/2013 | Dong | H04L 43/08 709/231 |
| 2013/0297767 | A1* | 11/2013 | Kozine | G06F 11/3447 709/224 |
| 2013/0342538 | A1* | 12/2013 | Kozine | H04L 43/04 345/440 |
| 2019/0089795 | A1* | 3/2019 | Yoshida | G06Q 30/0201 |

FOREIGN PATENT DOCUMENTS

| | | |
|---|---|---|
| JP | 2015-195530 A | 11/2015 |
| WO | 2017/159490 A1 | 9/2017 |

OTHER PUBLICATIONS

Written Opinion for PCT/JP2017/040673 dated Feb. 2, 2018 [PCT/ISA/237].

Ginga Kawaguchi, "Using Network Access Logs in Web Use Wait Time Measurements". IEICE, Feb. 29, 2016, pp. 153-158, vol. 115, No. 496.

\* cited by examiner

COMMUNICATION SESSION LOG ANALYSIS DEVICE, METHOD AND RECORDING MEDIUM

CROSS REFERENCE TO RELATED APPLICATIONS

This application is a National Stage of International Application No. PCT/JP2017/040673 filed Nov. 13, 2017, claiming priority based on Japanese Patent Application No. 2016-222395 filed Nov. 15, 2016.

TECHNICAL FIELD

The present invention relates to a communication session log analysis device, a method, and a recording medium for analyzing a communication session log of a user.

BACKGROUND ART

In general, a web site is composed of multiple contents such as a text, a script, an image, and a moving image. Thus, when a user browses a web site by using a communication terminal, it is necessary to perform communication for acquiring all contents composing the web site. As a communication for acquiring contents of a web site, a hypertext transfer protocol (HTTP) is often used, and, in this case, a communication terminal performs as many HTTP communications as the number of contents.

For example, when a certain web site is composed of one text, one script, and two images, a communication terminal is required to execute an HTTP communication four times, in order to acquire and display all contents of the web site. A series of communications such as transmission of a content request and reception of a content performed in one time of communication is called a session. As described above, in order to browse one web site, it is necessary to execute a plurality of times of HTTP sessions. Hereinafter, a plurality of times of HTTP sessions necessary for browsing one web site is collectively called one web session.

On the other hand, in order to evaluate quality of user experience on a web session, a certain node within a network accumulates a communication session of a user as a log and analyzes the communication session log. Representative examples of evaluation of quality of user experience include evaluation of time required for a web session, specifically, time from accessing to a web site to displaying the web site, or time to completing acquisition of all contents of the web site. Hereinafter, the time required for a web session is called web session time.

A communication session log is recorded on a session (an HTTP session, in case of HTTP communication) basis. Specifically, information on a communication start time, an end time, an address, a content type, a uniform resource locator (URL), and the like is recorded. However, it is difficult to specify, from the log, which one of HTTP sessions an HTTP session constituting a particular web session is. This is because it is difficult in practice to save a detail of a content (a detail of Hyper Text Markup Language (HTML) or a script), which needs to be saved in order to specify an associated web site from an HTTP session, due to a huge size of log data.

PTL 1 discloses a communication behavior analysis device that integrates, as one bulk, HTTP sessions of an identical user to be started within predetermined threshold value (fixed value) time from a start time of a reference HTTP session. In this case, time required for a bulk strongly depends on the threshold value. For example, when the threshold value is set to three seconds, time required for a bulk exhibits an extreme increase in distribution probability near three seconds, and, when the threshold value is set to five seconds, time required for a bulk exhibits an increase in distribution probability near five seconds.

As illustrated in FIG. 12, it is assumed that quality of user experience is evaluated assuming that the above-described bulk is a web session and the above-described time required for the bulk is web session time. In FIG. 12, HTTP sessions of an identical user to be started within fixed threshold value time from a start time of a reference HTTP session are integrated into one web session. In this case, deviation in a distribution of web session time is caused by a fixed threshold value. Thus, quality of user experience cannot be evaluated with high precision.

A communication session log analysis device solving this problem is proposed in Japanese Patent Application No. 2016-052729. In this device, as illustrated in FIG. 13, HTTP sessions of an identical user to be started within threshold value time, which is stochastically set on the basis of a predetermined probability distribution, from a start time of a reference HTTP session are integrated into one web session (called content access in Japanese Patent Application No. 2016-052729). Thus, deviation in a distribution of web session time caused by a fixed threshold value as in PTL 1 is suppressed, and precision in evaluation of quality of user experience can be enhanced.

CITATION LIST

Patent Literature

[PTL 1] Japanese Unexamined Patent Application Publication No. 2015-195530

SUMMARY OF INVENTION

Technical Problem

When HTTP sessions are integrated into a web session, both PTL 1 and Japanese Patent Application No. 2016-052729 regard HTTP sessions started within threshold value time from a start time of a reference HTTP session, as an identical web session. At this time, there arise two problems as follows.

A first problem is a case when HTTP sessions #1 to #6, which are originally one web session #1, are erroneously integrated into web session #1 of HTTP sessions #1 to #3 and into web session #2 of HTTP sessions #4 to #6, as illustrated in FIG. 14. This erroneous integration may possibly occur due to delay of HTTP session #4. When this erroneous integration occurs, web session time for each of web sessions #1 and #2 is short compared with original web session time, which results in acquiring web session time shorter than actual web session time.

A second problem is a case when HTTP sessions #1 to #3 and #1' to #3', which are originally different web sessions #1 and #1', are erroneously integrated into one web session #1 of HTTP sessions #1 to #3', as illustrated in FIG. 15. This erroneous integration may possibly occur due to successive execution of HTTP sessions #1 to #3 and HTTP sessions #1' to #3'. When this erroneous integration occurs, web session time for web session #1 is long compared with each original web session time, which results in acquiring web session time longer than actual web session time.

As described above, the first and second problems enlarge an error between acquired web session time and actual web session time, resulting in decreasing precision in evaluation of quality of user experience with use of web session time.

The present invention has been made in light of the above-described problems, and an object of the present invention is to provide a communication session log analysis device allowing integration of communication session logs that makes it possible to provide web session time with which quality of user experience can be evaluated with high precision.

Solution to Problem

A communication session log analysis device according to the present invention that updates, based on a communication session log, information relating to a web session being a group of a plurality of communication sessions necessary for browsing one web site, includes: a web session integration means for acquiring session information on one communication session, and integrating, when time elapsed from a start time of a reference communication session to a start time of the one communication session is equal to or less than a threshold value, the one communication session into the same web session as the reference communication session, a threshold value setting means for setting the threshold value, based on a predetermined probability distribution, and a filtering means for determining validity of the web session by statistical testing based on statistical information relating to a configuration of the web site, and extracting the web session determined as valid.

A communication session log analysis method according to the present invention that updates, based on a communication session log, information relating to a web session being a group of a plurality of communication sessions necessary for browsing one web site, includes: setting a threshold value, based on a predetermined probability distribution, acquiring session information on one communication session, and integrating, when time elapsed from a start time of a reference communication session to a start time of the one communication session is equal to or less than the threshold value, the one communication session into the same web session as the reference communication session, and determining validity of the web session by statistical testing based on statistical information relating to a configuration of the web site, and extracting the web session determined as valid.

A communication session log analysis program, recorded in a non-transitory computer readable recording medium according to the present invention and causing a computer to execute processing of updating, based on a communication session log, information relating to a web session being a group of a plurality of communication sessions necessary for browsing one web site, causes a computer to execute: processing of setting a threshold value, based on a predetermined probability distribution, processing of acquiring session information on one communication session, and causing, when time elapsed from a start time of a reference communication session to a start time of the one communication session is equal to or less than the threshold value, the one communication session to belong to the same web session as the reference communication session, and processing of determining validity of the web session by statistical testing based on statistical information relating to a configuration of the web site, and extracting the web session determined as valid.

Advantageous Effects of Invention

The present invention is able to provide a communication session log analysis device allowing integration of communication session logs that makes it possible to provide web session time with which quality of user experience can be evaluated with high precision.

EXAMPLE EMBODIMENT

Example embodiments of the present invention are described below in detail with reference to the drawings. While, the example embodiments described below include technically preferable limitations to carry out the present invention, the scope of the invention is not limited to the following.

First Example Embodiment

Figure 1:
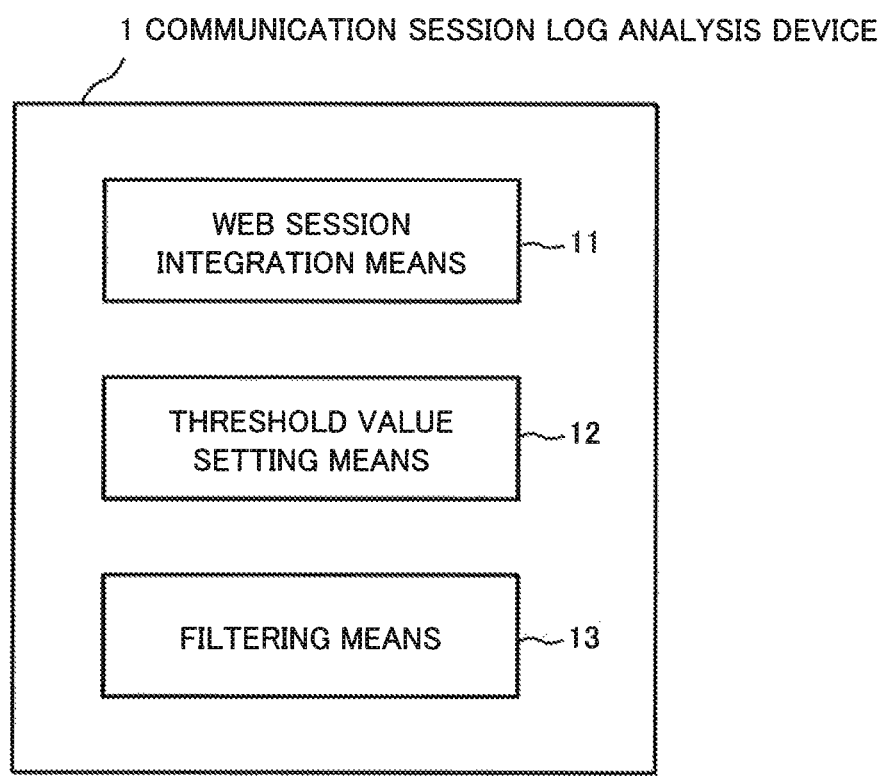
FIG. 1 shows a block diagram illustrating a configuration of a communication session log analysis device according to a first example embodiment of the present invention.

FIG. 1 is a block diagram illustrating a configuration of a communication session log analysis device according to a first example embodiment of the present invention. A communication session log analysis device 1 according to the present example embodiment is a communication session log analysis device that updates, on the basis of a communication session log, information relating to a web session being a group of a plurality of communication sessions necessary for browsing one web site.

The communication session log analysis device 1 includes a web session integration means 11 for acquiring session information on one communication session, and integrating, when time elapsed from a start time of a reference communication session to a start time of the one communication session is equal to or less than a threshold value, the one communication session into the same web session as the reference communication session. The communication session log analysis device 1 further includes a threshold value setting means 12 for setting the threshold value on the basis of a predetermined probability distribution. The communication session log analysis device 1 further includes a filtering means 13 for determining validity of the web session by statistical testing based on statistical information relating to a configuration of the web site, and extracting the web session determined as valid.

According to the present example embodiment, the filtering means 13 deletes a web session determined as invalid in regard to integration of a communication session. This suppresses an error between web session time acquired as a result of integration performed by the communication session log analysis device 1 and actual web session time. Consequently, precision in evaluation of quality of user experience with use of web session time can be enhanced.

As described above, the present example embodiment is able to provide a communication session log analysis device allowing integration of communication session logs that makes it possible to provide web session time with which quality of user experience can be evaluated with good precision.

Second Example Embodiment

Figure 2:
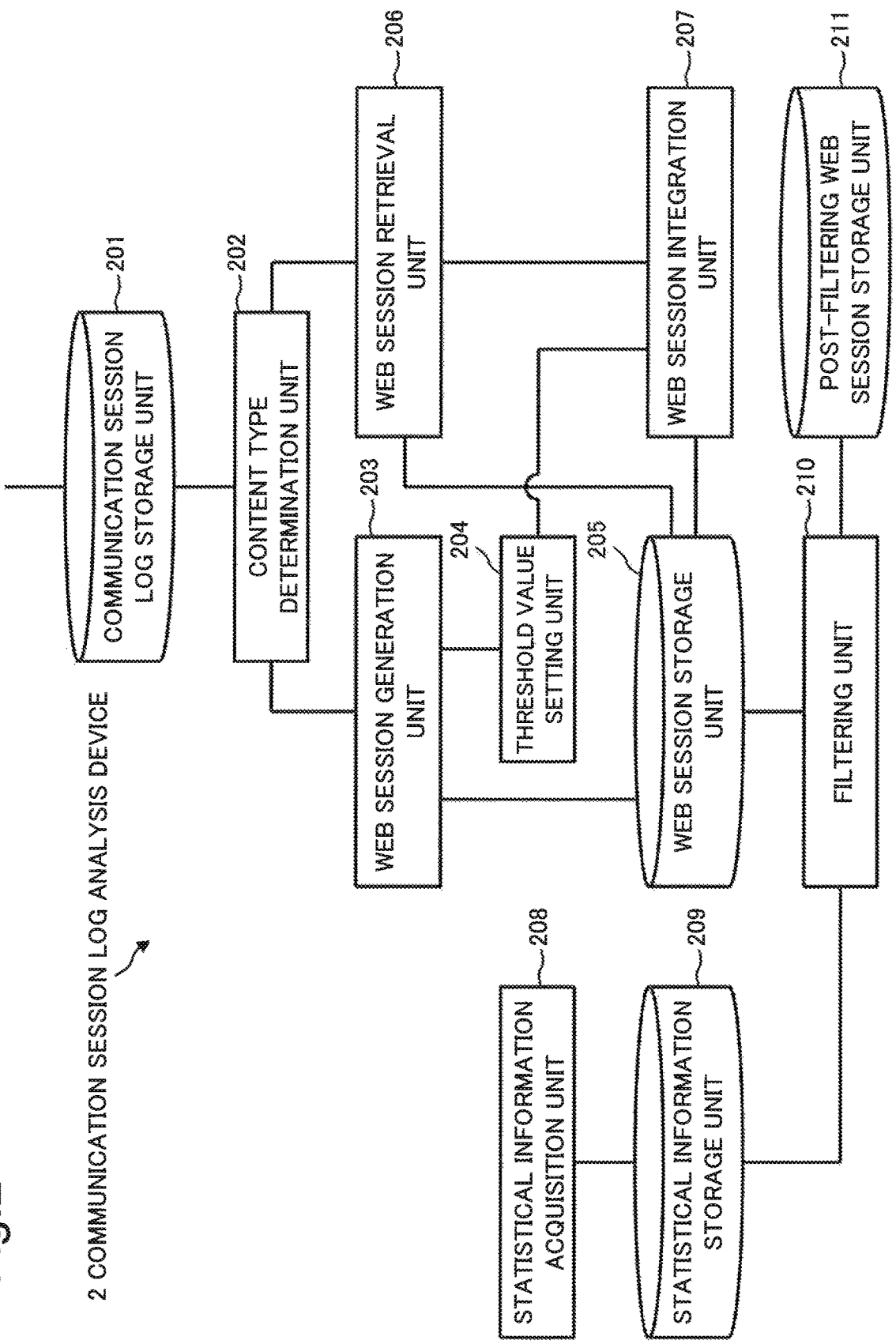
FIG. 2 shows a block diagram illustrating a configuration of a communication session log analysis device according to a second example embodiment of the present invention.

FIG. 2 is a block diagram illustrating a configuration of a communication session log analysis device according to a second example embodiment of the present invention. A communication session log analysis device 2 according to the present example embodiment is a specific mode of the communication session log analysis device 1 according to the first example embodiment that analyzes a communication session log having session information on a communication session.

The communication session log analysis device 2 includes a communication session log storage unit 201, a content type determination unit 202, a web session generation unit 203, a threshold value setting unit 204, a web session storage unit 205, a web session retrieval unit 206, and a web session integration unit 207. Further, the communication session log analysis device 2 includes a statistical information acquisition unit 208, a statistical information storage unit 209, a filtering unit 210, and a post-filtering web session storage unit 211.

Correspondence between the components of the communication session log analysis device 1 according to the first example embodiment and the components of the above-described communication session log analysis device 2 is as follows. That is, the web session integration means 11 includes the communication session log storage unit 201, the content type determination unit 202, the web session generation unit 203, the web session storage unit 205, the web session retrieval unit 206, and the web session integration unit 207. Further, the threshold value setting means 12 includes the threshold value setting unit 204. Furthermore, the filtering means 13 includes the statistical information acquisition unit 208, the statistical information storage unit 209, the filtering unit 210, and the post-filtering web session storage unit 211.

Each function of the components of the communication session log analysis device 2 is described below.

The communication session log storage unit 201 acquires and saves session information on a communication session (an HTTP session, in case of HTTP) basis, as a communication session log. The session information is, specifically, a session start time (transmission start time), a session end time (reception completion time), a content type (text/html, image/jpeg, and the like), a requesting-source internet protocol (IP) address (an IP address of a terminal), a user agent (UA), a URL, content size, and the like.

The content type determination unit 202 acquires session information on a communication session (HTTP session), as a communication session log, from the communication session log storage unit 201. When a content type of an HTTP session is text/html, the content type determination unit 202 determines the HTTP session as a new web session (access to a web site). Then, the content type determination unit 202 sets the HTTP session as a reference HTTP session, and proceeds to processing of the web session generation unit 203. Further, when a content type of an HTTP session is determined as not a new web session, the content type determination unit 202 proceeds to processing of the web session retrieval unit 206.

The web session generation unit 203 generates initial data on a new web session on the basis of information that a reference HTTP session for the new web session has, and stores the initial data in the web session storage unit 205.

The web session storage unit 205 stores data on a web session.

The threshold value setting unit 204 sets a threshold value of a time interval between HTTP sessions, for use in determination when the web session integration unit 207 integrates the HTTP sessions, in accordance with a predetermined method to be described later, for example, a predetermined probability distribution.

The web session retrieval unit 206 retrieves, from the web session storage unit 205, a web session having the same IP address as a requesting-source IP address (terminal IP address) for an HTTP session.

The web session integration unit 207 acquires session information on a target HTTP session, and determines whether the target HTTP session belongs to a web session retrieved by the web session retrieval unit 206. Then, when the target HTTP session is determined as belonging to the web session, the web session integration unit 207 updates the web session by integrating the target HTTP session into the web session.

In other words, when time elapsed from a start time of a reference HTTP session to a start time of a target HTTP session is equal to or less than a threshold value, the web session integration unit 207 determines that the target HTTP session belongs to a web session of the reference HTTP session. Then, the web session integration unit 207 updates the web session by integrating the target HTTP session into the web session, and stores the updated web session in the web session storage unit 205.

Herein, as a specific method of integration, for example, in the case of distinguishing by an identifier for each web session, a method of attaching the same identifier as a reference HTTP session to a target HTTP session can be exemplified. Further, in the case of distinguishing by a folder where to save for each web session, saving a target HTTP session in the same folder as a reference HTTP session can be exemplified. Note that a method of integration is not limited to the above-described methods, as long as the method is a method capable of clarifying belonging to the same web session.

The statistical information acquisition unit 208 acquires, from a web site, information on, for example, number of hyperlinks, number of contents, content size, and the like, which are statistical information relating to a configuration of a web site.

The statistical information storage unit 209 stores statistical information relating to a configuration of a web site acquired by the statistical information acquisition unit 208.

The filtering unit 210 statistically determines, by using statistical testing based on statistical information stored in the statistical information storage unit 209, whether a web session stored in the web session storage unit 205 is integrated validly. The statistical testing will be described later. When the web session is determined as integrated validly, the filtering unit 210 saves the web session data in the post-filtering web session storage unit 211, and, when the web session is determined as integrated invalidly, the filtering unit 210 deletes the web session data. In a manner as described above, the filtering unit 210 extracts a validly integrated web session.

The post-filtering web session storage unit 211 saves a validly integrated web session extracted by the filtering unit 210. Hereinafter, web session data, which are saved in the post-filtering web session storage unit 211 and determined as integrated validly, are available for evaluation of quality of user experience and the like, through calculation of web session time and the like.

The communication session log analysis device 2 according to the present example embodiment is implemented on a computer. Specifically, the communication session log analysis device 2 is stored in an auxiliary storage device in a form of a program. The auxiliary storage device is a non-transitory tangible medium. A central processing unit (CPU) mounted on a computer reads the program from the auxiliary storage device, develops the program in a primary storage device, and executes processing in accordance with the program.

Figure 3:
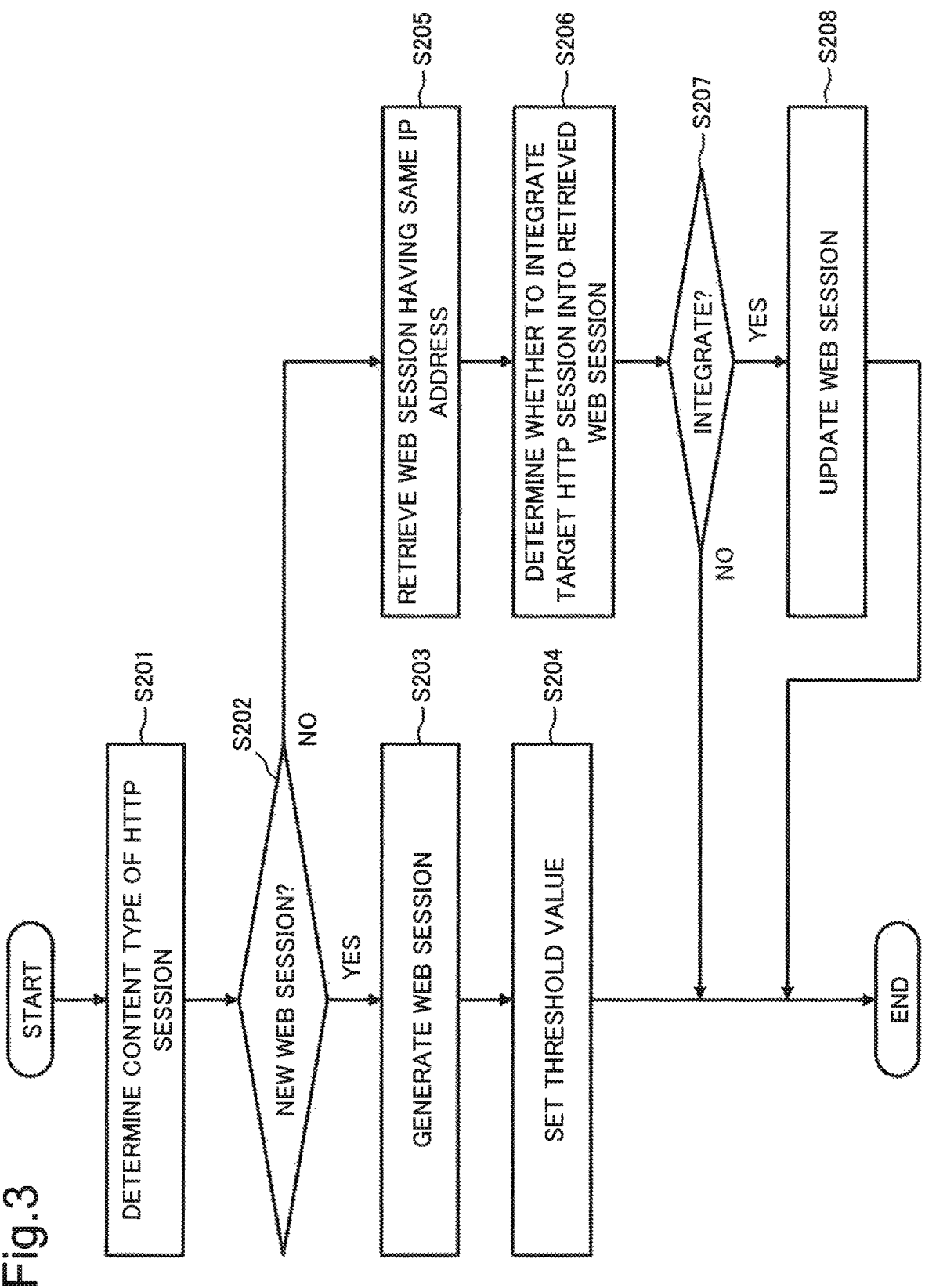
FIG. 3 shows a flowchart illustrating a web session integration operation of the communication session log analysis device according to the second example embodiment of the present invention.

FIG. 3 is a flowchart illustrating an operation of integrating a communication session into a web session, performed by the communication session log analysis device 2 according to the present example embodiment. The flowchart in FIG. 3 starts every time a new communication session (an HTTP session, in case of HTTP) is saved in the communication session log storage unit 201 of the communication session log analysis device 2.

The content type determination unit 202 acquires, as a communication session log, session information on an HTTP session from the communication session log storage unit 201. The content type determination unit 202 determines a content type of the HTTP session (Step S201). Further, the content type determination unit 202 sorts, on the basis of the content type, whether to proceed to the processing of the web session generation unit 203, or to proceed to the processing of the web session retrieval unit 206.

Specifically, when a content type is determined as a new web session (YES in Step S202), the content type determination unit 202 proceeds to the processing of the web session generation unit 203.

When an HTTP session is determined as a first HTTP session in one web session, the content type determination unit 202 determines the HTTP session as a new web session. For example, when a content type of an HTTP session is 'text/html', the content type determination unit 202 determines the HTTP session as a first HTTP session in a web session. Since many of web sites are created on the basis of 'text/html', the content type determination unit 202 can determine an HTTP session whose content type is 'text/html' as a first HTTP session.

When an HTTP session is determined as a second or subsequent HTTP session in one web session (NO in Step S202), the content type determination unit 202 proceeds to the processing of the web session retrieval unit 206. When an HTTP session whose content type is 'text/html' is determined as a first HTTP session in a web session as described above, the content type determination unit 202 determines a content type other than that as a second or subsequent HTTP session.

The web session generation unit 203 generates initial data on a new web session on the basis of information that a reference HTTP session for the new web session has, and stores the generated initial data in the web session storage unit 205 (Step S203).

A web session is information acquired by integrating a plurality of HTTP sessions into one. The web session generation unit 203 generates initial data on a web session, using, as a reference HTTP session, an HTTP session determined as a first HTTP session in one web session.

In other words, a web session includes information on a web session start time (a start time of a first HTTP session) and a web session end time (a latest time among end times of integrated HTTP sessions). Further, a web session includes information on an IP address of an accessing terminal, a UA of an application of an accessing terminal, and a URL of a web site. Furthermore, a web session includes information on content size (content size in total acquired in integrated HTTP sessions), number of integrated HTTP sessions, threshold value time set by the threshold value setting unit 204, and the like. Integration of HTTP sessions is described later as processing of the web session integration unit 207.

The threshold value setting unit 204 sets a threshold value of a time interval between HTTP sessions, in accordance with a predetermined method, for example, a predetermined probability distribution to be described later, and the like (Step S204). This threshold value is used when the web session integration unit 207 determines whether to integrate an HTTP session into a target web session.

When an HTTP session is determined as a second or subsequent HTTP session in one web session (NO in Step S202), the web session retrieval unit 206 retrieves, from the web session storage unit 205, a web session having the same IP address as a requesting-source IP address (terminal IP address) for the HTTP session (Step S205).

The web session integration unit 207 acquires information on a target HTTP session, and determines whether the target HTTP session belongs to a web session retrieved by the web session retrieval unit 206 (Step S206). Specifically, the web session integration unit 207 determines whether time elapsed from a start time of a reference HTTP session in a retrieved web session to a start time of a target HTTP session is equal to or less than a threshold value set by the threshold value setting unit 204. When the time elapsed is equal to or less than the threshold value, the web session integration unit 207 determines that the target HTTP session belongs to the web session, and integrates the target HTTP session into the web session.

Figure 12:
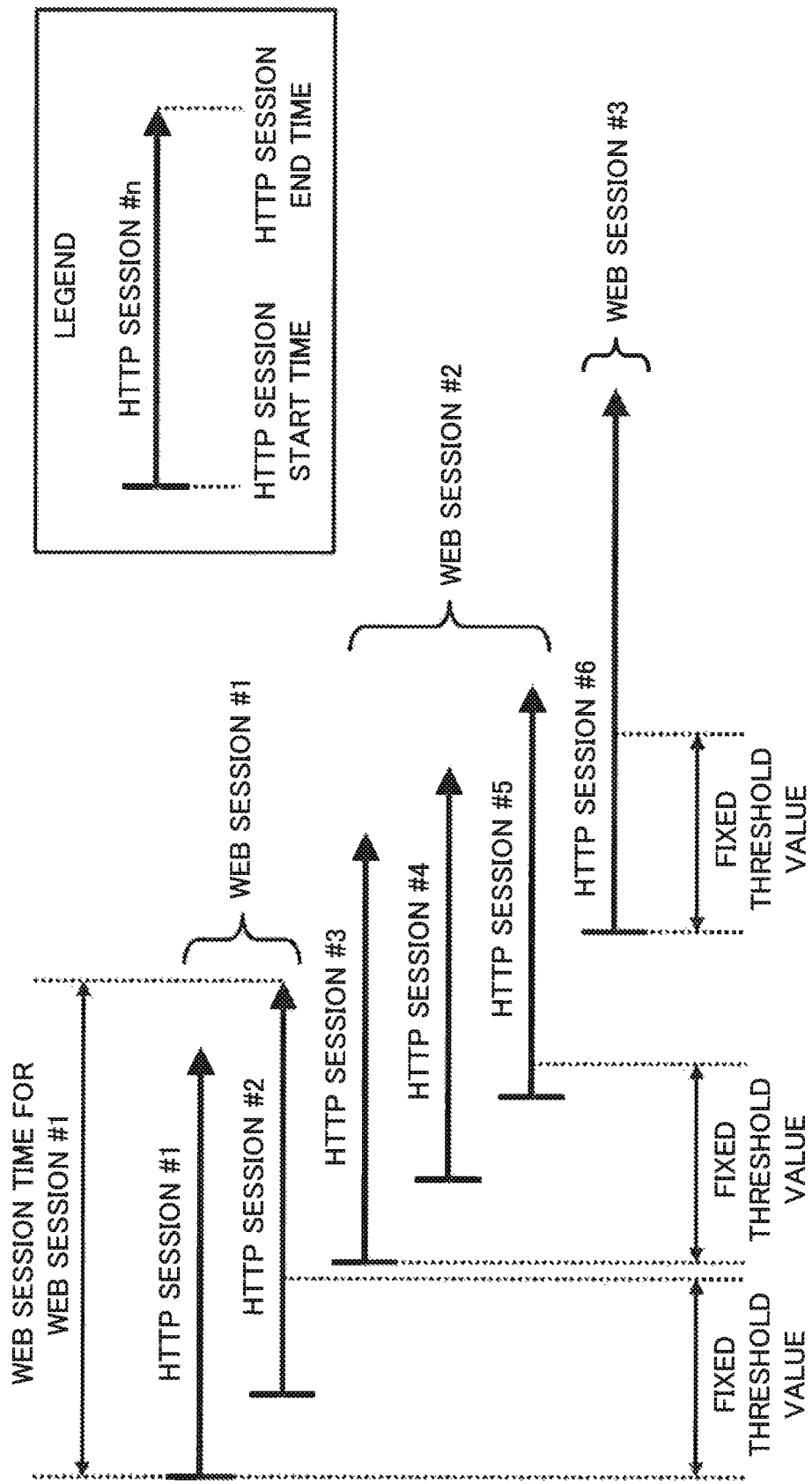
FIG. 12 shows an explanatory diagram illustrating integration of HTTP sessions, based on a fixed threshold value.

FIG. 12 is an explanatory diagram illustrating an example of integration of HTTP sessions based on a fixed threshold value. In FIG. 12, HTTP sessions of an identical user started within fixed threshold value time from a start time of a reference HTTP session are integrated into one web session. In other words, in the example in FIG. 12, HTTP sessions #1 to #2 are integrated into web session #1, HTTP sessions #3 to #5 are integrated into web session #2, and HTTP session #6 is integrated into web session #3.

Figure 13:
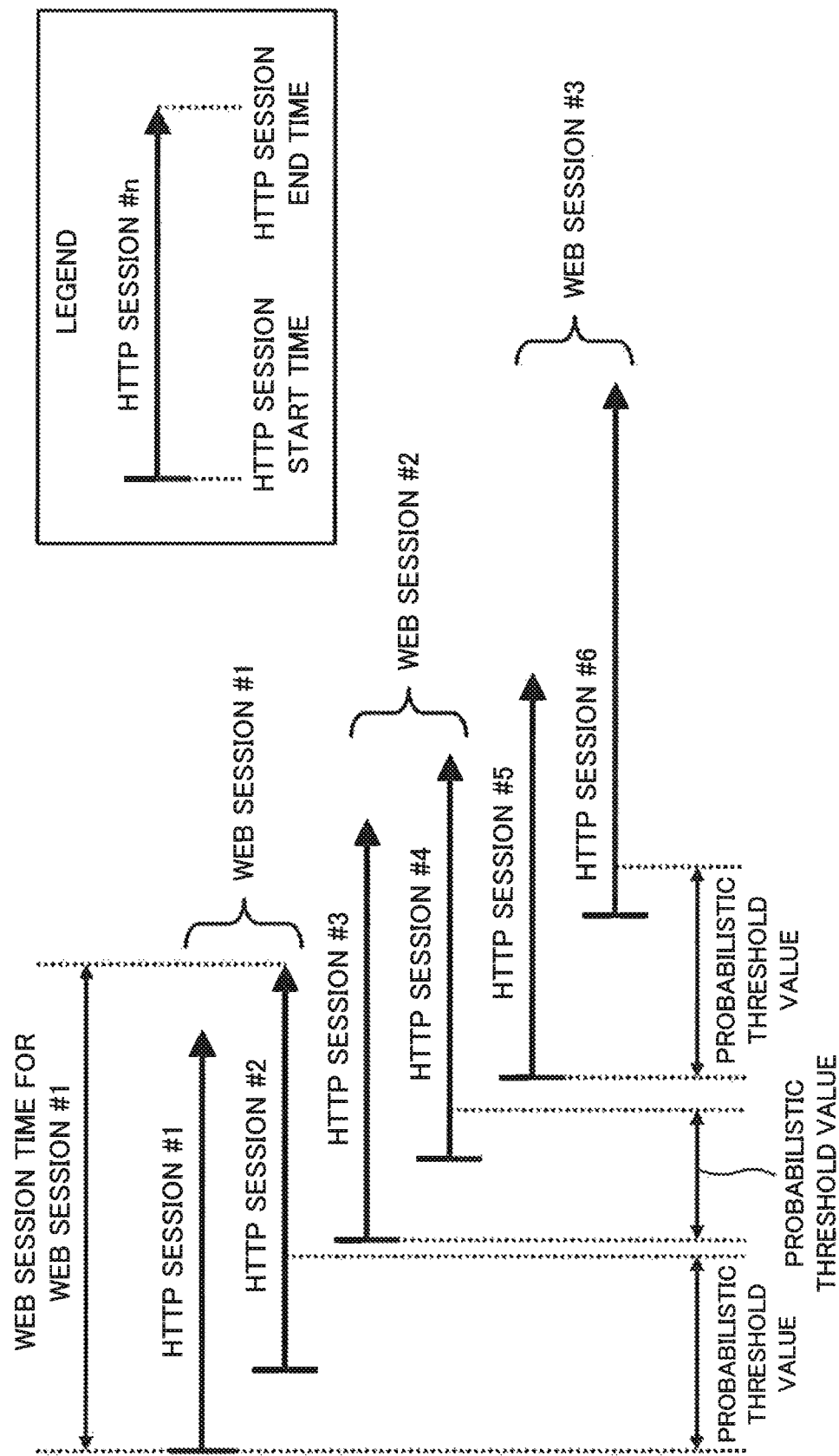
FIG. 13 shows an explanatory diagram illustrating integration of HTTP sessions, based on a probabilistic threshold value.
Figure 14:
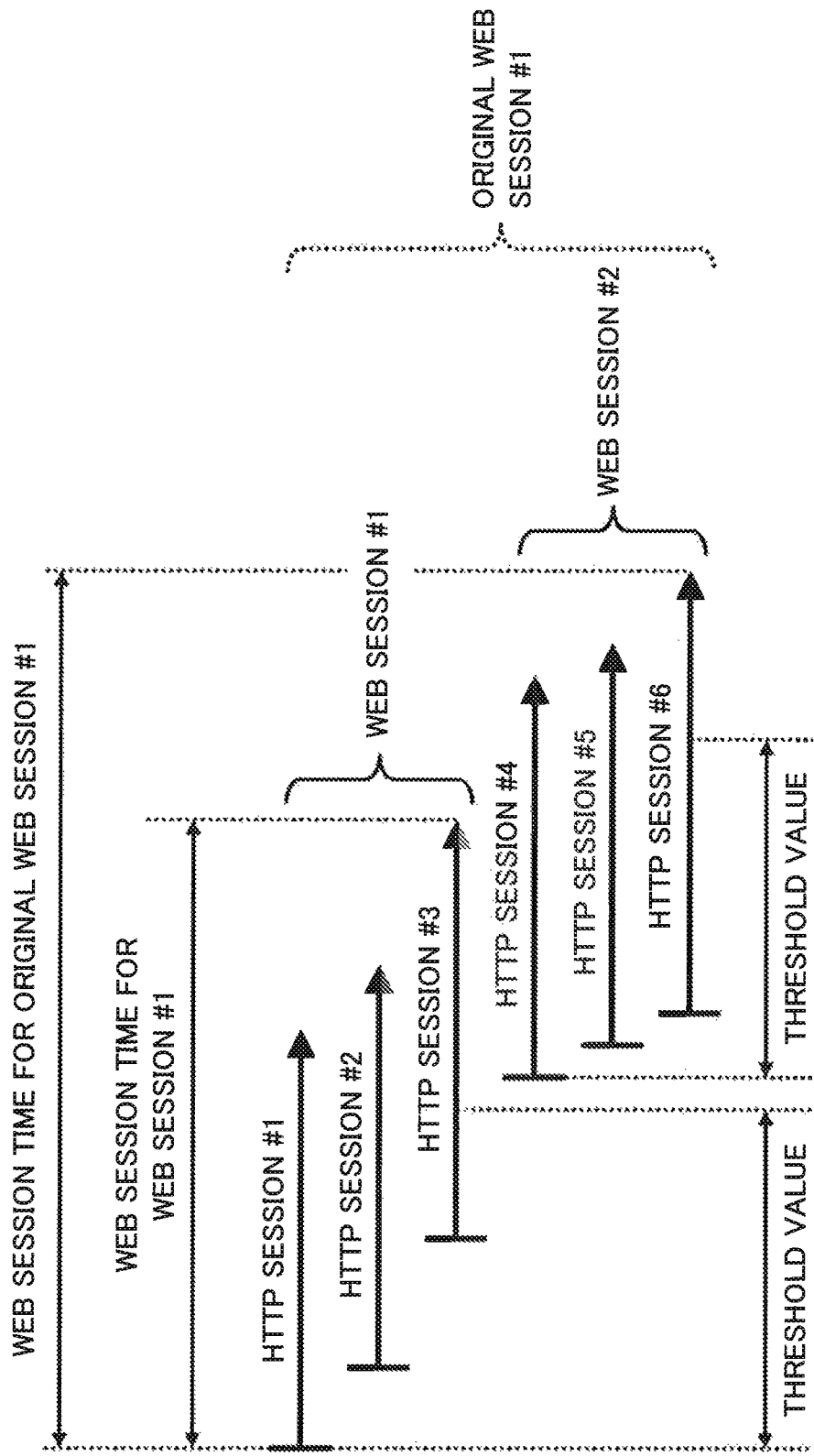
FIG. 14 shows an explanatory diagram illustrating a first problem to be solved by the present invention.
Figure 15:
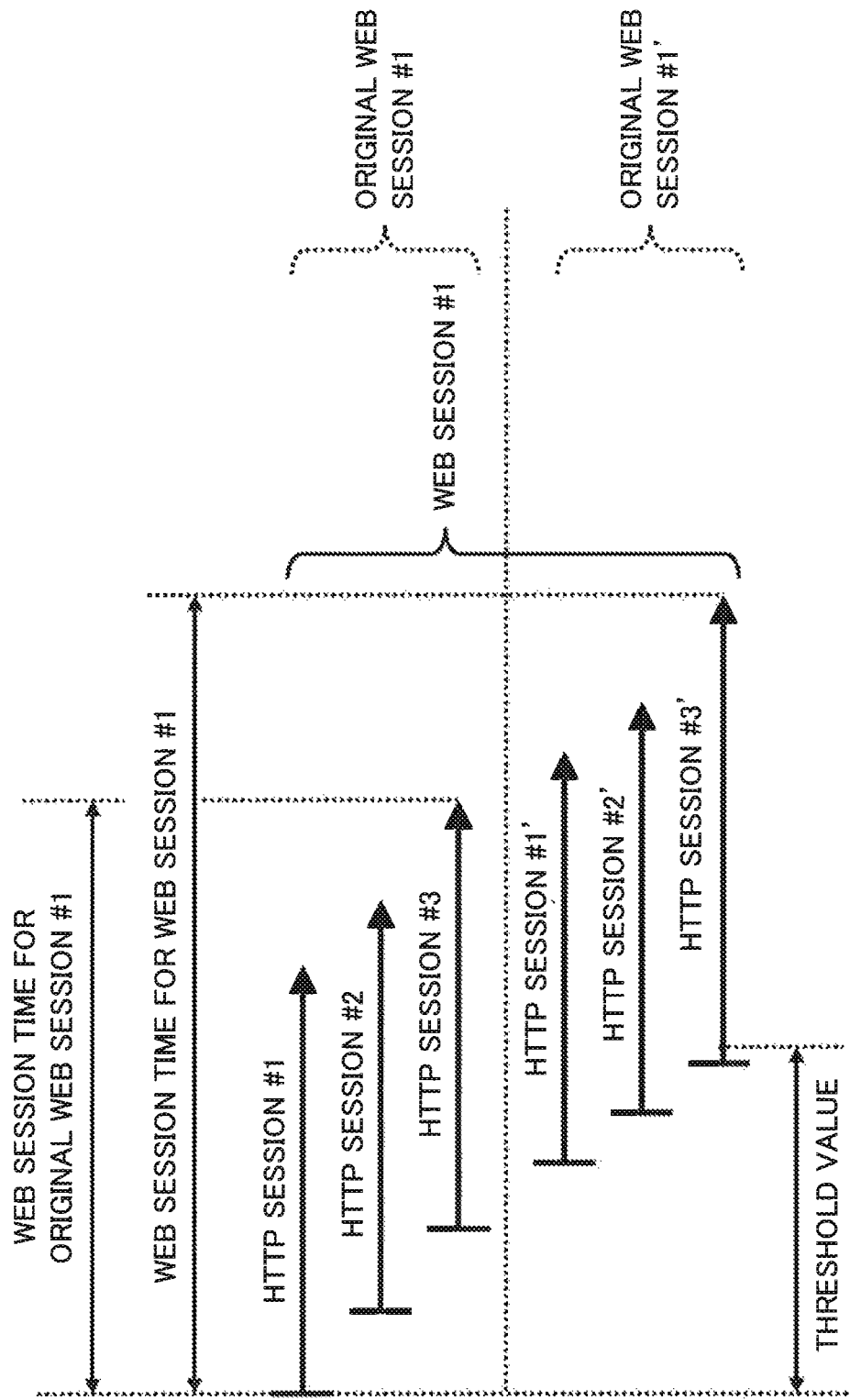
FIG. 15 shows an explanatory diagram illustrating a second problem to be solved by the present invention.

FIG. 13 is an explanatory diagram illustrating an example of integration of HTTP sessions based on a probabilistic threshold value. A threshold value in this case stochastically varies. In FIG. 13, HTTP sessions of an identical user started within threshold value time, which is stochastically set on the basis of a predetermined probability distribution, from a start time of a reference HTTP session are integrated into one web session. In other words, in the example in FIG. 13, HTTP sessions #1 to #2 are integrated into web session #1, HTTP sessions #3 to #4 are integrated into web session #2, and HTTP sessions #5 to #6 are integrated into web session #3.

When a target HTTP session is determined to be integrated into a web session (YES in Step S207), the web session integration unit 207 updates information on a web session end time, content size, number of integrated HTTP sessions, and the like, and stores the updated information in the web session storage unit 205 (Step S208).

In other words, when an end time of an HTTP session being a target for integration is later than an end time of a web session before integration, the web session integration unit 207 updates the end time of the web session, by using the end time of the HTTP session being a target for integration. Further, the web session integration unit 207 adds content size by content size of an HTTP session being a target for integration. Furthermore, the web session integration unit 207 adds one to number of integrated HTTP sessions.

When a target HTTP session is determined not to be integrated into the web session (NO in Step S207), the web session integration unit 207 does not update the web session and ends the processing.

Note that an HTTP session determined not to be integrated may be left. The reason is that, for example, for the purpose of evaluating quality of user experience, influence on evaluation caused by ignoring an HTTP session determined not to be integrated is almost ignorable, since a huge number of logs are acquired.

When the web session retrieval unit 206 retrieves a plurality of web sessions, the web session integration unit 207 can make the above-described determination on integration, in order of the oldest start time or the newest start time of the plurality of retrieved web sessions. In all cases, a target HTTP session is integrated into a web session, a start time of which is within threshold value time from a start time of a reference HTTP session. Note that the web session integration unit 207 does not integrate a target HTTP session that has been integrated into one web session into further another web session.

Next, setting a threshold value by the threshold value setting unit 204 (Step S204) is described in a specific manner. The threshold value setting unit 204 can set a threshold value fixedly, or being stochastically varied on the basis of a predetermined probability distribution. In the following, a method of stochastically setting a threshold value is described first.

The threshold value setting unit 204 can use, as a probability distribution for setting a probabilistic threshold value, probability distributions such as a uniform distribution, a beta distribution, a normal distribution, a gamma distribution, an exponential distribution, and a Weibull distribution. A distribution of a probabilistic threshold value has influence on a statistic on web session time (time from a start time to an end time of a web session), which is a primary factor in quality of user experience. In order to acquire time close to actual web session time, a probability distribution preferably satisfies the following three characteristics.

First, a probability distribution has a probability density function being continuous in a domain of definition. With this characteristic, a probability distribution becomes a smooth cumulative distribution, which can prevent a distribution of web session time from being distorted in shape. The probability distributions enumerated above have this property.

Second, a probability distribution has a probability density function having compact support (finite support), that is, a set (support) of values taken by a random variable is finite. This characteristic ensures that a distribution range of a threshold value is a bounded closed set. This can prevent a threshold value from becoming too large. For example, since a normal distribution has no compact support, selectability of a threshold value expands to infinity. Thus, when a threshold value becomes too large, integration may be concentrated only on a web session by the threshold value, making it difficult to acquire accurate web session time.

On the other hand, when a threshold value is selected in a probability distribution with no compact support and the threshold value becomes too large, a method of re-selecting a threshold value again may be used. However, in this case, there may arise an undesirable situation that a threshold value does not follow an original probability distribution and a probability distribution of the threshold value becomes discontinuous, and the like.

Third, a probability distribution has a probability density function converging to zero at an end point of support. Even when a distribution of a threshold value has compact support, in the case of not converging to zero at an end point of support as in a uniform distribution, a distribution of web session time is distorted at the end point of support. Selecting a probability distribution converging to zero at a support end point can prevent this. This probability distribution may be preferably, for example, a beta distribution in FIG. 5 to be described later, and the like, but is not limited to the beta distribution.

Note that, in the case of a distribution being asymptotic to zero at an end point rather than being strictly zero at an end point as in a normal distribution, discontinuity at an end point of a distribution range can be substantially eliminated, as long as being equal to or less than one-tenth of a maximum value (peak) in a probability density distribution at the end point. As a result of this, a substantially smooth probability density distribution of web session time can be acquired, and thus, the probability density distribution may be regarded as substantially zero at the end point. Note that one-hundredth or less of a maximum value at an end point is more preferable.

Figure 4:
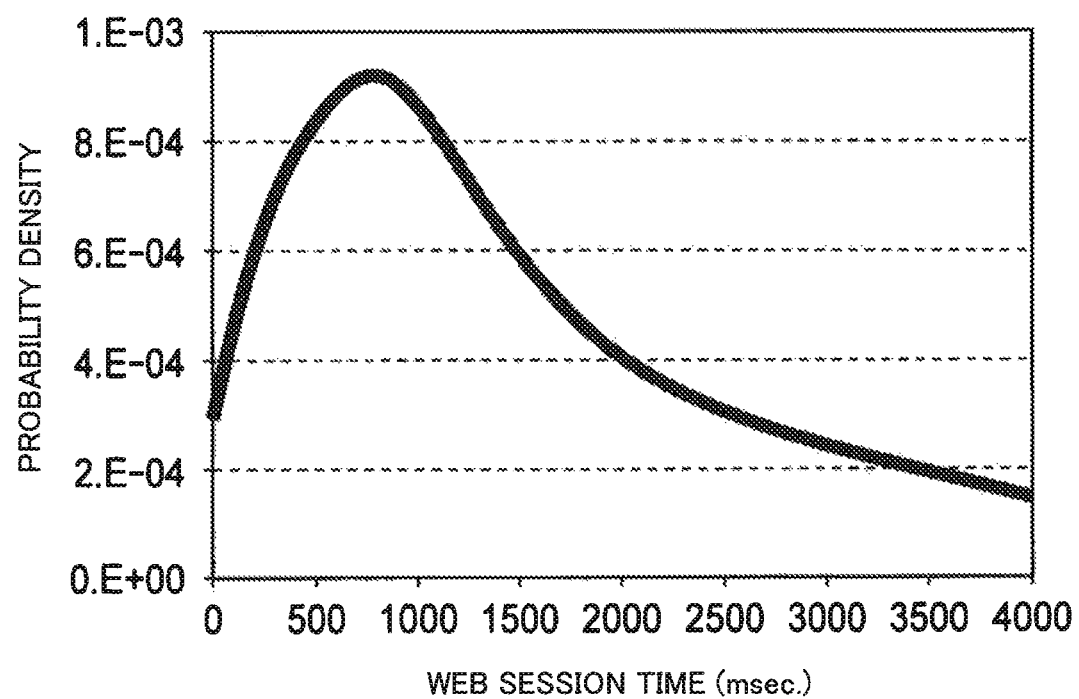
FIG. 4 shows an explanatory diagram illustrating an example of actual web session time.
Figure 5:
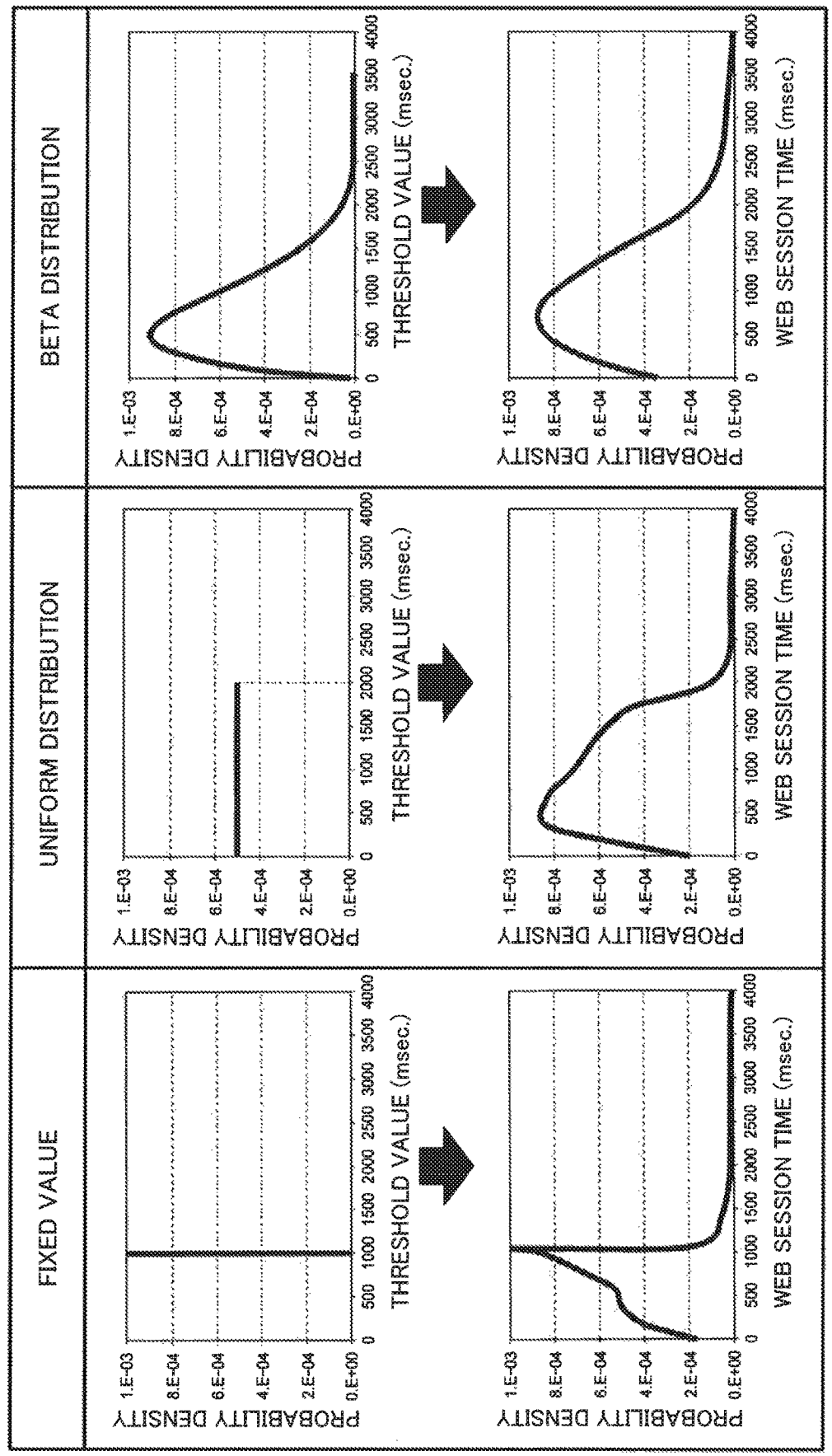
FIG. 5 shows an explanatory diagram illustrating web session time associated with a manner of setting a threshold value.

FIG. 4 is an explanatory diagram illustrating an example of probability density of actual web session time. Further, FIG. 5 is an explanatory diagram illustrating probability density of web session time associated with a manner of setting a threshold value, acquired by the communication session log analysis device 2, with respect to the example of probability density of actual web session time in FIG. 4. In FIG. 5, as a manner of setting a threshold value, a case of a fixed value, a case of a uniform distribution, and a case of a beta distribution are exemplified.

In the case of a fixed value, an example of one second as a threshold value (an expected value is one second) is indicated. In the case of a uniform distribution, an example in which a probability distribution is a uniform distribution from zero to two seconds (an expected value is one second) is indicated. In the case of a beta distribution, an example of following a beta distribution having a support length of three-point-five seconds (an expected value is one second) is indicated. Note that even a case of a fixed value can be regarded as being a probability distribution having a probability of 100% by an expected value.

Herein, an expected value can be set by assuming time from start of a web session to transmission of a last HTTP session in the web session, by reference to a plurality of web session times observed in advance. At this time, it is preferable to set an expected value to time with which an HTTP session belonging to another web session is prevented from being erroneously integrated into an identical web session. Further, it is also possible to update a once set value while observing an operational status.

A threshold value is, in the case of using a probability distribution, randomly set for an expected value in such a way that a value set in each integrated web session becomes a beta distribution as a whole, for a beta distribution. Further, for a uniform distribution, a threshold value is randomly set in such a way that a value set in each integrated web session becomes a uniform distribution as a whole.

As illustrated in FIG. 5, when a threshold value is a fixed value, web session time has a peak near the threshold value. This indicates that deviation in a distribution of web session time is caused by a fixed threshold value. When precision in evaluation of quality of user experience with use of web session time does not matter so much, a fixed threshold value can be used.

Further, when a threshold value follows a uniform distribution, a peak as in a fixed value is suppressed, but a distribution of web session time is not smooth near two seconds being a support end point. When precision in evaluation of quality of user experience with use of web session time does not matter so much, a threshold value following a uniform distribution can be used. Then, in this case, higher precision can be acquired than in the case of using a fixed threshold value.

Further, when a threshold value follows a beta distribution, web session time becomes a distribution smoothly connected to the bottom (rightward in the distribution). This is a distribution close to actual web session time in FIG. 4. In other words, in order to acquire high precision in evaluation of quality of user experience with use of web session time, a threshold value following a beta distribution is preferably used. Note that, in order to acquire high precision, a probability distribution followed by a threshold value is not limited to a beta distribution, but is preferably a probability distribution satisfying the above-described three characteristics: the first, second, and third characteristics.

According to the flowchart in FIG. 3, each HTTP session is integrated into a web session to which it should belong. Then, a web session into which each HTTP session is integrated is saved in the web session storage unit 205. Next, a method of filtering an integrated web session is described.

Figure 6:
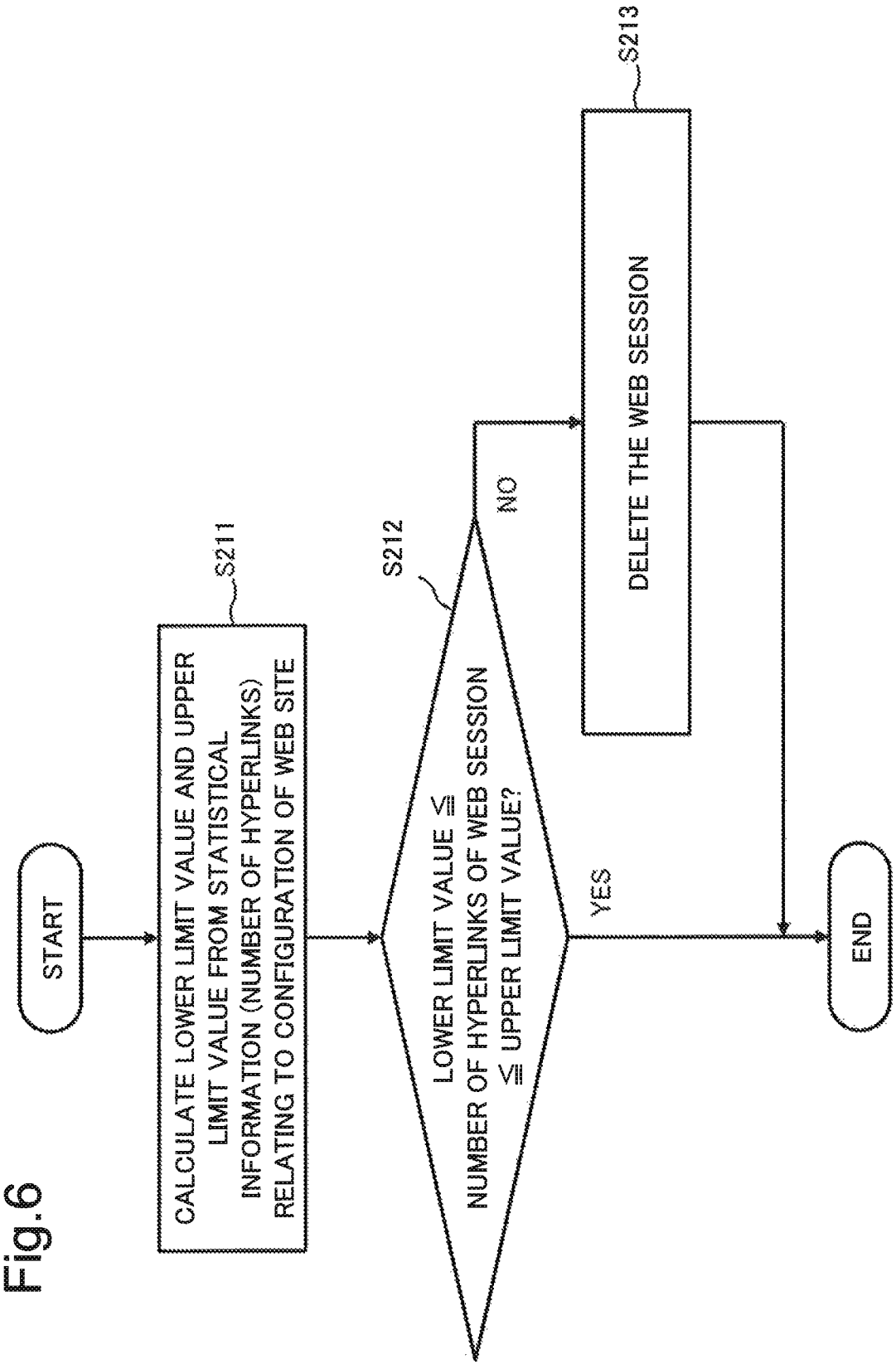
FIG. 6 shows a flowchart illustrating a filtering operation of the communication session log analysis device according to the second example embodiment of the present invention.

FIG. 6 is a flowchart illustrating a filtering operation of the communication session log analysis device 2 according to the present example embodiment. The flowchart in FIG. 6 starts every time the filtering unit 210 retrieves the web session storage unit 205 and a web session for which threshold value time has elapsed from a web session start time is retrieved.

The filtering unit 210 performs, on a web session stored in the web session storage unit 205, statistical testing based on statistical information relating to a configuration of a web site acquired in advance, and thereby determines validity of a configuration of the web session. Further, the filtering unit 210 deletes a web session determined as invalid.

In other words, as a preparation in advance for statistical testing in the present flowchart, the statistical information acquisition unit 208 acquires statistical information relating to a configuration of a web site from a plurality of web sites in advance. As statistical information relating to a configuration of a web site, a statistical amount (an amount of data, a mean value, a standard deviation, skewness, kurtosis, and the like), a probability density function, a cumulative distribution function, and the like of such as number of hyperlinks, number of contents, and content size can be exemplified. Note that it is assumed that statistical information relating to a configuration of a web site to be acquired herein is also included in a communication session log. For example, when number of hyperlinks is selected as statistical information, information on the number of hyperlinks may be also included in a communication session log.

Acquired statistical information is stored in the statistical information storage unit 209.

Herein, the flowchart in FIG. 6 is described by exemplifying, as an example of statistical information, number of hyperlinks on a web site, that is, number of web sites to which it is possible to transition from a certain web site.

Upon start of the flowchart, first, the filtering unit 210 calculates a lower limit value and an upper limit value of number of hyperlinks on each web site, which is statistical information relating to a configuration of a web site stored in the statistical information storage unit 209 (Step S211).

Next, the filtering unit 210 determines whether number of hyperlinks of a target web session is as follows: the lower limit value≤the number of hyperlinks of the web session≤the upper limit value (Step S212).

When YES in Step S212, the filtering unit 210 determines a configuration of the target web session as valid, and ends the processing. Further, when NO in Step S212, the filtering unit 210 determines a configuration of the web session as invalid, deletes the target web session (Step S213), and ends the processing.

In a manner as described above, the filtering unit 210 can extract a web session determined as valid, and save the extracted web session in the post-filtering web session storage unit 211.

Note that the filtering unit 210 may save both a web session determined as valid and a web session determined as invalid in the post-filtering web session storage unit 211, in such a way that the web sessions can be distinguished from each other. As a method of distinguishment, for example, attaching different identifiers, storing in separate folders, or the like is possible.

Next, a filtering method using statistical testing is described in a specific manner. The statistical testing is carried out in the following procedure. That is, (1) hypotheses are set, (2) a rejection region is set, and (3) whether a null hypothesis can be rejected is tested. Hereinafter, description is given for each of lower and upper one-sided tests.

First, in the lower one-sided test, a case in which a web session, which is originally one web session, is erroneously integrated as a plurality of web sessions can be deleted in a manner as follows.

(1) Hypotheses are Set as Follows.

Null hypothesis H0=A web session after integration indicates a single web session.

Alternative hypothesis H1=A single web session is integrated as a plurality of web sessions.

(2) A Rejection Region for Null Hypothesis H0 is Set.

Figure 7:
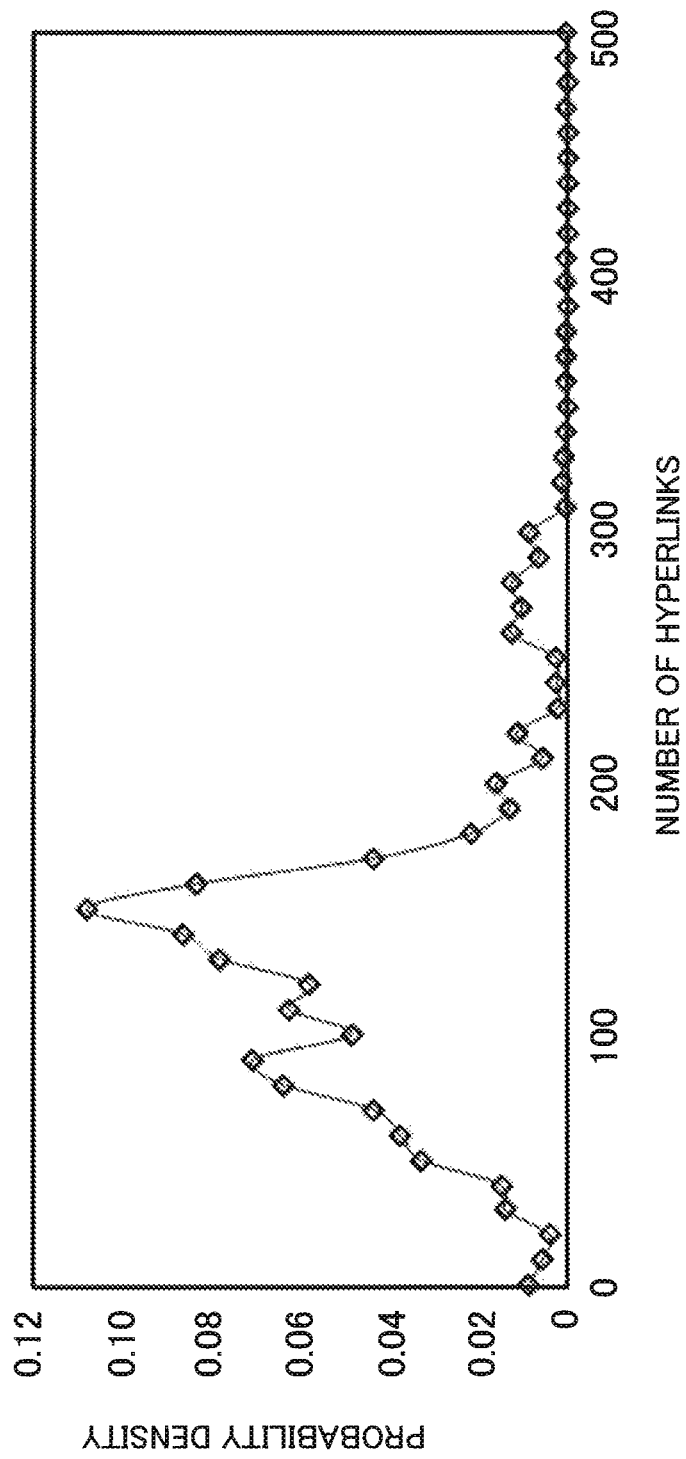
FIG. 7 shows an explanatory diagram illustrating an example of actual number of hyperlinks.
Figure 8:
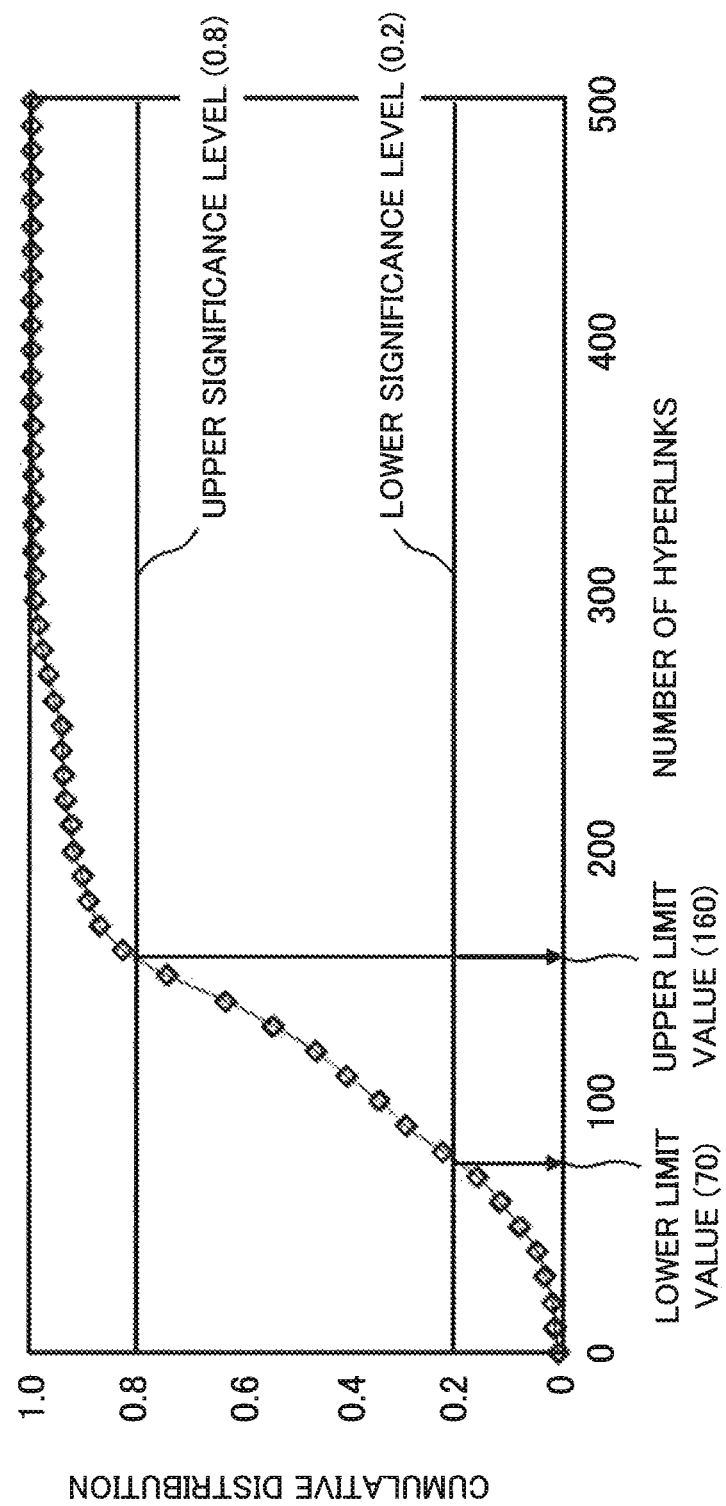
FIG. 8 shows an explanatory diagram illustrating an example of setting a lower limit value and an upper limit value of number of hyperlinks when filtering is performed.

When a lower significance level is set to a certain value, number of hyperlinks corresponding to the lower significance level is a lower limit value. For example, when information on actual number of hyperlinks and probability density thereof as indicated in FIG. 7 is present as statistical information, a relation between number of hyperlinks and cumulative distribution thereof indicated in FIG. 8 can be acquired on the basis of FIG. 7. In FIG. 8, when a lower significance level is set to 0.2, a lower limit value is 70. At this time, a case in which number of hyperlinks is less than 70 falls into a rejection region (Step S211).

(3) Whether a Null Hypothesis is Rejected is Tested.

When number of hyperlinks of an HTTP session integrated into a web session is less than the lower limit value indicated in (2) (NO in Step S212), the null hypothesis is rejected, and thus, the alternative hypothesis is employed. In this case, integration of the web session is determined as invalid, and is deleted (Step S213). Further, when number of hyperlinks of an HTTP session integrated into a web session is equal to or more than the lower limit value indicated in (2) (YES in Step S212), the null hypothesis is not rejected, and thus, the null hypothesis is employed.

Next, in the upper one-sided test, a case in which web sessions, which are originally a plurality of web sessions, are erroneously integrated as one web session can be deleted in a manner as follows.

(1) Hypotheses are Set as Follows.

Null hypothesis H0=A web session after integration indicates a single web session.

Alternative hypothesis H1=A plurality of web sessions are integrated as a single web session.

(2) A Rejection Region for Null Hypothesis H0 is Set.

When an upper significance level is set to a certain value, number of hyperlinks corresponding to the upper significance level is an upper limit value. For example, in FIG. 8, when an upper significance level is set to 0.8, an upper limit value is 160. At this time, a case in which number of hyperlinks is more than 160 falls into a rejection region (Step S211).

(3) Whether a Null Hypothesis is Rejected is Tested.

When number of hyperlinks of an HTTP session integrated into a web session is more than the upper limit value indicated in (2) (NO in Step S212), the null hypothesis is rejected, and thus, the alternative hypothesis is employed. In this case, integration of the web session is determined as invalid, and is deleted (Step S213). Further, when number of hyperlinks of an HTTP session integrated into a web session is equal to or less than the upper limit value indicated in (2) (YES in Step S212), the null hypothesis is not rejected, and thus, the null hypothesis is employed.

When a web session, which is originally one web session, is erroneously integrated as a plurality of web sessions, each of the plurality of web sessions is small in scale, and thus, number of hyperlinks thereof is less than the lower limit value in FIG. 8 with high possibility. Further, when web sessions, which are originally a plurality of web sessions, are erroneously integrated as one web session, the one integrated web session is large in scale, and thus, number of hyperlinks thereof is more than the upper limit value in FIG. 8 with high possibility.

Therefore, as described above, by using an upper limit value and a lower limit value of number of hyperlinks as statistical information, and performing statistical testing on number of hyperlinks in total on HTTP sessions integrated into one web session, an advantageous effect of excluding an erroneously integrated web session can be expected. Note that this advantageous effect is not limited to the case of using number of hyperlinks, but can be also expected in the case of using number of contents, content size, and the like, which are statistical information relating to a configuration of a web site.

Figure 9:
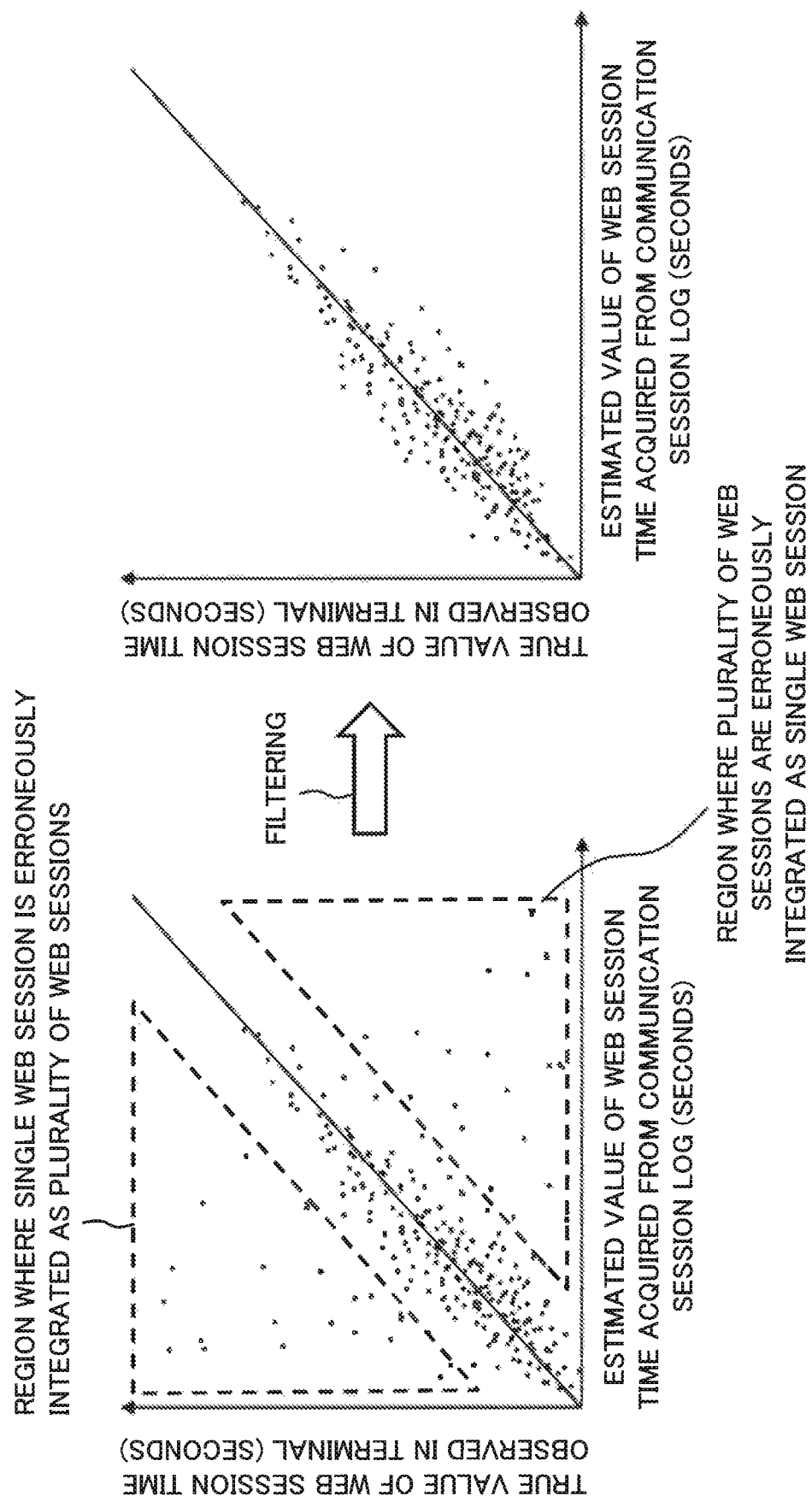
FIG. 9 shows an explanatory diagram illustrating an advantageous effect of the communication session log analysis device according to the second example embodiment of the present invention.

FIG. 9 is an explanatory diagram illustrating an advantageous effect of filtering performed by the communication session log analysis device 2 according to the present example embodiment. In a relation in FIG. 9 between a true value of web session time observed in a terminal and an estimated value of web session time acquired from a communication session log, a left graph indicates a case in which no filtering has been performed by the filtering unit 210, and a right graph indicates a case in which filtering has been performed.

In the case of the left graph, there are a region where an estimated value of web session time is considerably small and a region where an estimated value of web session time is considerably large, in comparison with a true value of web session time. This region where an estimated value is small is considered as being caused by erroneously integrating a single web session as a plurality of web sessions. Further, the region where an estimated value is large is considered as being caused by erroneously integrating a plurality of web sessions as a single web session.

On the other hand, in the right graph, there are not a region where an estimated value of web session time is considerably small or a region where an estimated value of web session time is considerably large, in comparison with a true value of web session time. This is because, in the right graph, a case in which a single web session is erroneously integrated as a plurality of web sessions and a case in which a plurality of web sessions are erroneously integrated as a single web session are deleted by performing filtering.

As described above, the communication session log analysis device 2 according to the present example embodiment is able to delete an erroneously integrated web session, by performing filtering on a two-sided test using both lower and upper one-sided tests. This suppresses an error between web session time acquired as a result of integration performed by the communication session log analysis device 2 and actual web session time. Consequently, precision in evaluation of quality of user experience with use of web session time can be enhanced.

As described above, the present example embodiment is able to provide a communication session log analysis device allowing integration of communication session logs that makes it possible to provide web session time with which quality of user experience can be evaluated with good precision.

Third Example Embodiment

Figure 10:
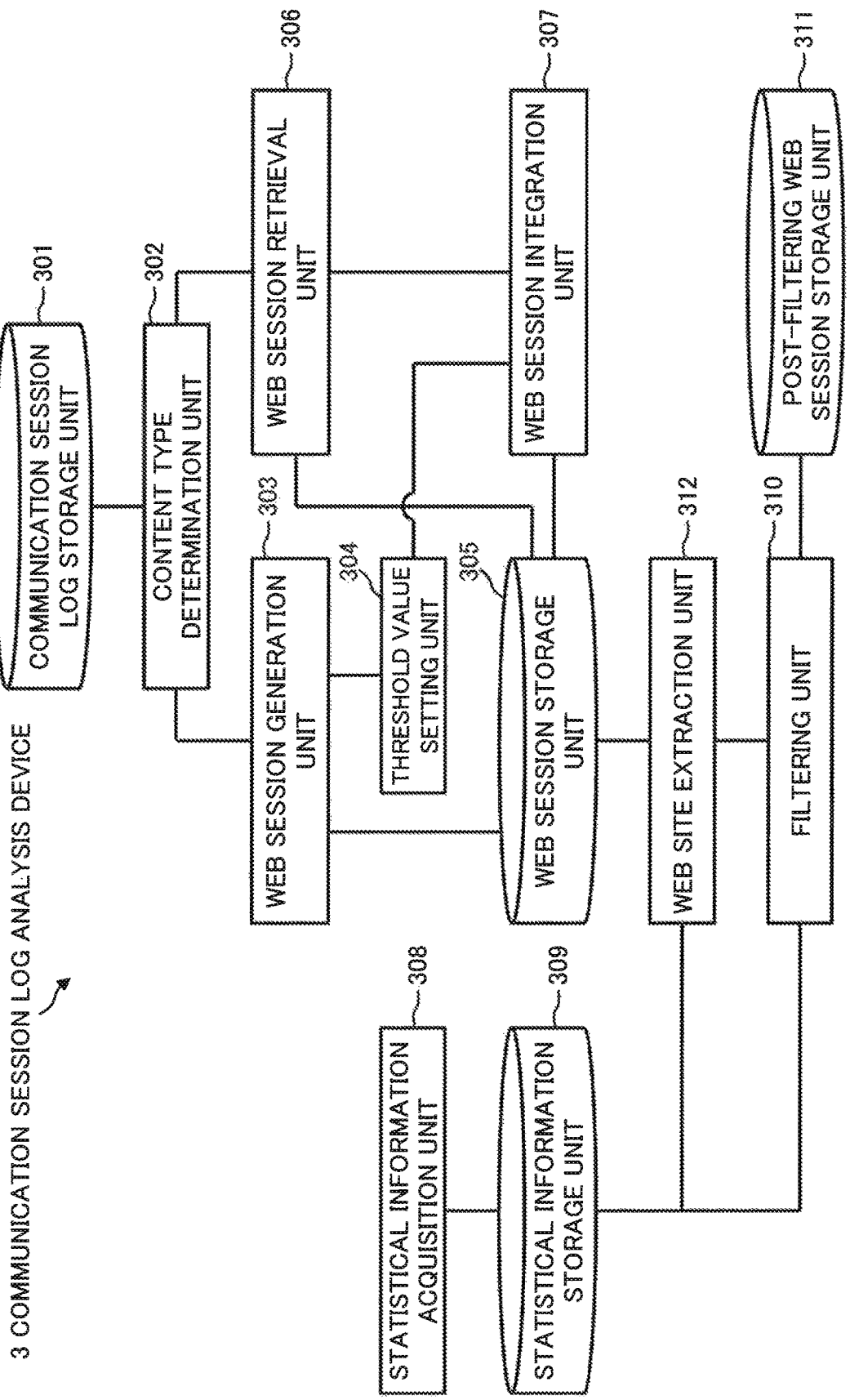
FIG. 10 shows a block diagram illustrating a configuration of a communication session log analysis device according to a third example embodiment of the present invention.

FIG. 10 is a block diagram illustrating a configuration of a communication session log analysis device according to a third example embodiment of the present invention. A communication session log analysis device 3 according to the present example embodiment is different from the communication session log analysis device 2 according to the second example embodiment in that a web site extraction unit 312 is newly added.

A communication session log storage unit 301, a content type determination unit 302, a web session generation unit 303, a threshold value setting unit 304, a web session storage unit 305, a web session retrieval unit 306, a web session integration unit 307, a statistical information acquisition unit 308, a statistical information storage unit 309, a filtering unit 310, and a post-filtering web session storage unit 311, which are other components of the communication session log analysis device 3, are similar to those of the communication session log analysis device 2 according to the second example embodiment.

When statistical testing on a web session is performed, the web site extraction unit 312 extracts a web site for which erroneous integration is difficult to detect, and deletes a web session for this web site from statistical testing. Since a web site subjected to statistical testing is a web site for which erroneous integration is easy to detect, precision in filtering on a web session can be enhanced.

In statistical testing, easiness to detect erroneous integration means that a width between a lower limit value and an upper limit value is narrower, when an upper significance level and a lower significance level are fixed with certain values. In view of this, in the present example embodiment, web sites for which erroneous integration is difficult to detect are extracted on the basis of a statistical amount relating to a configuration of a web site, and excludes web sessions for these web sites.

In the present example embodiment, when statistical information relating to a configuration of a web site pertains to any of the following four conditions, determination as being a configuration for which erroneous integration is difficult to detect is made. That is, the four conditions include (1) a case in which an amount of data is small, (2) a case in which a standard deviation is large, (3) a case in which kurtosis is small, and (4) a case in which skewness is far from zero. A threshold value is set for each of these pieces of statistical information, and, when this threshold value is exceeded, determination as being a web site for which erroneous integration is difficult to detect can be made.

An operation of the web site extraction unit 312 is described below in a specific manner by using, as an example, number of hyperlinks as statistical information.

First, it is assumed that statistical information on number of hyperlinks on a web site is acquired for each domain, that is, each part xxx in http://xxx/aaa. At this time, the statistical information acquisition unit 308 acquires statistical information for each domain that is a set of web sites, like "statistical information (a standard deviation, kurtosis, and the like) on number of hyperlinks for a domain xxx", "statistical information (a standard deviation, kurtosis, and the like) on number of hyperlinks for a domain yyy" . . . , and saves the statistical information in the statistical information storage unit 309.

Next, when a terminal accesses a web site (http://xxx/bbb.html), the web site extraction unit 312 is able to know the web site of an access destination, from a web session into which an HTTP session of a communication log is integrated. The web site extraction unit 312 acquires, from the statistical information storage unit 309, statistical information associated with xxx that is a domain of the web site of an access destination. Herein, when any of four values of an amount of data, a standard deviation, kurtosis, and skewness, which are the statistical information on xxx, exceeds a threshold value, the web session is deleted from statistical testing.

The above operation of the web site extraction unit 312 is not limited to number of hyperlinks, but number of contents, content size, and the like, which are statistical information relating to a configuration of a web site, can be also used.

Figure 11:
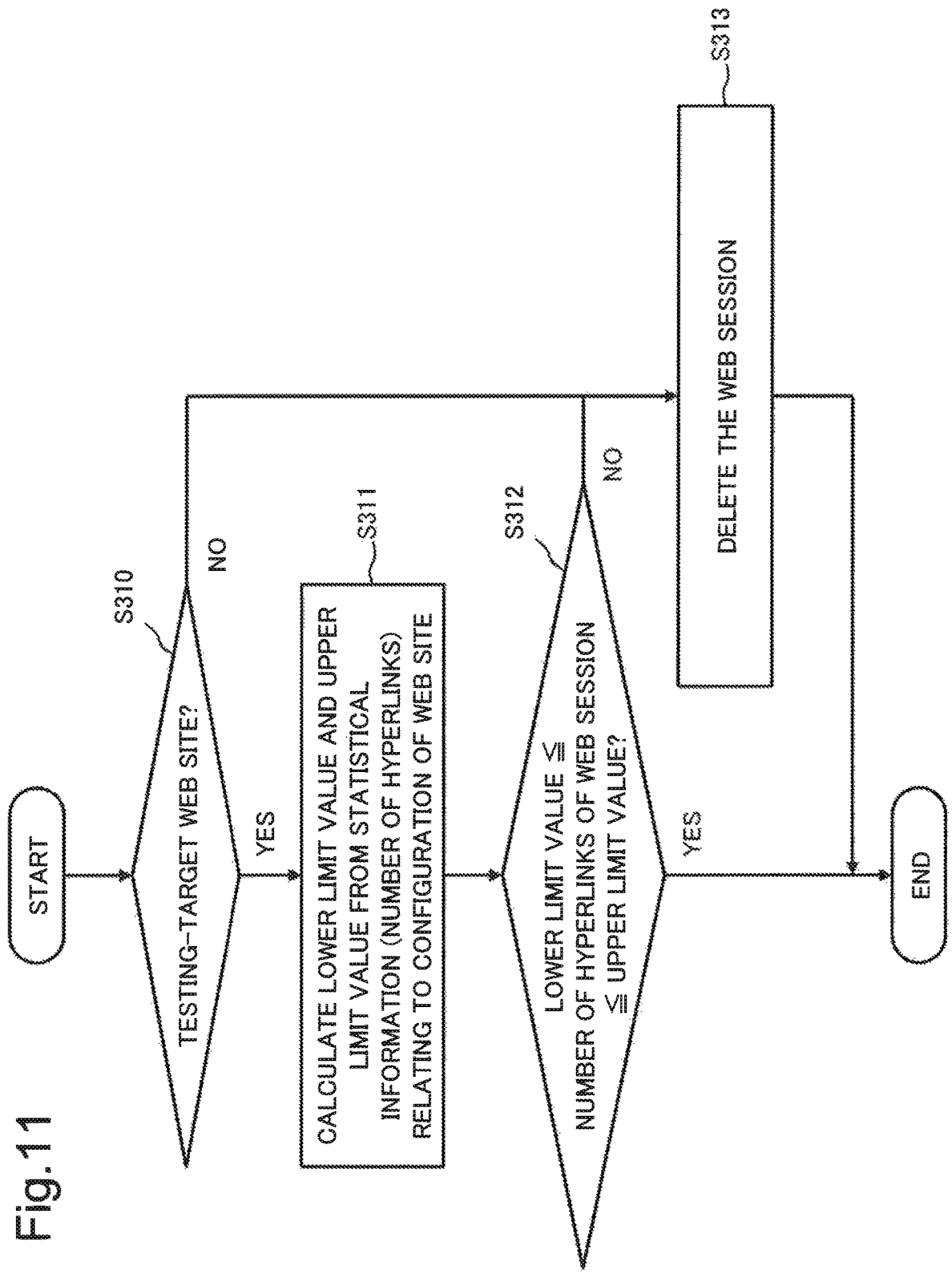
FIG. 11 shows a flowchart illustrating a filtering operation of the communication session log analysis device according to the third example embodiment of the present invention.

FIG. 11 is a flowchart illustrating a filtering operation of the communication session log analysis device 3 according to the present example embodiment. The flowchart in FIG. 11 starts every time the web site extraction unit 312 retrieves the web session storage unit 305 and a web session for which threshold value time has elapsed from a web session start time is retrieved.

First, the web site extraction unit 312 determines whether a web site of an access destination of the web session is a target for statistical testing (Step S310).

In this determination, as described above, the web site extraction unit 312 refers to statistical information for a domain of an access destination of a web session saved in the statistical information storage unit 309. Then, when this statistical information pertains to the above-described four conditions (1) to (4), the web site extraction unit 312 determines that the web session is not a target for statistical testing (NO in Step S310), and deletes the web session from a target for statistical testing (Step S313).

On the other hand, when this statistical information does not pertain to the above-described four conditions, the web site extraction unit 312 determines that the web session is a target for statistical testing (YES in Step S310), and proceeds to Step S311.

Hereinafter, operations in Steps S311, S312, and S313 are similar respectively to the operations in Steps S211, S212, and S213 of the flowchart in FIG. 6 according to the second example embodiment.

As described above, the communication session log analysis device 3 according to the present example embodiment extracts and deletes a web session for which erroneous integration is difficult to detect, and performs filtering by performing statistical testing on a web session for which erroneous integration is easy to detect. This enables the communication session log analysis device 3 to delete an erroneously integrated web session with better precision, in comparison with the communication session log analysis device 2 according to the second example embodiment. This further suppresses an error between web session time acquired as a result of integration performed by the communication session log analysis device 3 and actual web session time. Consequently, precision in evaluation of quality of user experience with use of web session time can be further enhanced.

As described above, the present example embodiment is able to provide a communication session log analysis device allowing integration of communication session logs that makes it possible to provide web session time with which quality of user experience can be evaluated with good precision.

And, the whole or part of the example embodiments disclosed above can be described as, but not limited to, the following supplementary notes.

(Supplementary Note 1)

A communication session log analysis device that updates, based on a communication session log, information relating to a web session being a group of a plurality of communication sessions necessary for browsing one web site, the device comprising:

a web session integration means for acquiring session information on one communication session, and integrating, when time elapsed from a start time of a reference communication session to a start time of the one communication session is equal to or less than a threshold value, the one communication session into the same web session as the reference communication session;

a threshold value setting means for setting the threshold value, based on a predetermined probability distribution; and a filtering means for determining validity of the web session by statistical testing based on statistical information relating to a configuration of the web site, and extracting the web session determined as valid.

(Supplementary Note 2)

The communication session log analysis device according to supplementary note 1, further comprising a web site extraction means for extracting, based on the statistical information, the web session not being a target for the statistical testing.

(Supplementary Note 3)

The communication session log analysis device according to supplementary note 2, wherein the web site extraction means deletes the web session not being a target for the statistical testing.

(Supplementary Note 4)

The communication session log analysis device according to any one of supplementary notes 1 to 3, wherein the filtering means deletes the web session determined as invalid.

(Supplementary Note 5)

The communication session log analysis device according to any one of supplementary notes 1 to 4, wherein the statistical information comprises a number of pieces of data, a mean value, a standard deviation, skewness, kurtosis, a probability density function, or a cumulative distribution function, of a number of hyperlinks, a number of contents, or a content size.

(Supplementary Note 6)

The communication session log analysis device according to any one of supplementary notes 1 to 5, wherein the predetermined probability distribution has a probability density function being continuous with compact support and converging to zero at a support end point.

(Supplementary Note 7)

A communication session log analysis method that updates, based on a communication session log, information relating to a web session being a group of a plurality of communication sessions necessary for browsing one web site, the method comprising:

setting a threshold value, based on a predetermined probability distribution;

acquiring session information on one communication session, and integrating, when time elapsed from a start time of a reference communication session to a start time of the one communication session is equal to or less than the threshold value, the one communication session into the same web session as the reference communication session; and determining validity of the web session by statistical testing based on statistical information relating to a configuration of the web site, and extracting the web session determined as valid.

(Supplementary Note 8)

The communication session log analysis method according to supplementary note 7, further comprising extracting the web session not being a target for the statistical testing, based on the statistical information.

(Supplementary Note 9)

The communication session log analysis method according to supplementary note 8, further comprising deleting the web session not being a target for the statistical testing.

(Supplementary Note 10)

The communication session log analysis method according to any one of supplementary notes 7 to 9, further comprising deleting the web session determined as invalid.

(Supplementary Note 11)

The communication session log analysis method according to any one of supplementary notes 7 to 10, wherein the statistical information comprises a number of pieces of data, a mean value, a standard deviation, skewness, kurtosis, a probability density function, or a cumulative distribution function, of a number of hyperlinks, a number of contents, or a content size.

(Supplementary Note 12)

The communication session log analysis method according to any one of supplementary notes 7 to 11, wherein the predetermined probability distribution has a probability density function being continuous with compact support and converging to zero at a support end point.

(Supplementary Note 13)

A non-transitory computer readable recording medium that records a communication session log analysis program causing a computer to execute processing of updating, based on a communication session log, information relating to a web session being a group of a plurality of communication sessions necessary for browsing one web site, the program causing a computer to execute:

processing of setting a threshold value, based on a predetermined probability distribution;

processing of acquiring session information on one communication session, and causing, when time elapsed from a start time of a reference communication session to a start time of the one communication session is equal to or less than the threshold value, the one communication session to belong to the same web session as the reference communication session; and processing of determining validity of the web session by statistical testing based on statistical information relating to a configuration of the web site, and extracting the web session determined as valid.

(Supplementary Note 14)

The non-transitory computer readable recording medium that records the communication session log analysis program according to supplementary note 13, the program further causing to execute processing of extracting, based on the statistical information, the web session not being a target for the statistical testing.

(Supplementary Note 15)

The non-transitory computer readable recording medium that records the communication session log analysis program according to supplementary note 14, the program further causing to execute processing of deleting the web session not being a target for the statistical testing.

(Supplementary Note 16)

The non-transitory computer readable recording medium that records the communication session log analysis program according to any one of supplementary notes 13 to 15, the program further causing to execute processing of deleting the web session determined as invalid.

(Supplementary Note 17)

The non-transitory computer readable recording medium that records the communication session log analysis program according to any one of supplementary notes 13 to 16, wherein the statistical information comprises a number of pieces of data, a mean value, a standard deviation, skewness, kurtosis, a probability density function, or a cumulative distribution function, of a number of hyperlinks, a number of contents, or a content size.

(Supplementary Note 18)

The non-transitory computer readable recording medium that records the communication session log analysis program according to any one of supplementary notes 13 to 17, wherein the predetermined probability distribution has a probability density function being continuous with compact support and converging to zero at a support end point.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-222395, filed on Nov. 15, 2016, the disclosure of which is incorporated herein in its entirety by reference.

REFERENCE SIGNS LIST 1, 2, 3 Communication session log analysis device
11 Web session integration means
12 Threshold value setting means
13 Filtering means
201, 301 Communication session log storage unit
202, 302 Content type determination unit
203, 303 Web session generation unit
204, 304 Threshold value setting unit
205, 305 Web session storage unit
206, 306 Web session retrieval unit
207, 307 Web session integration unit
208, 308 Statistical information acquisition unit
209, 309 Statistical information storage unit
210, 310 Filtering unit
211, 311 Post-filtering web session storage unit
312 Web site extraction unit

The invention claimed is:

1. A communication session log analysis device that updates, based on a communication session log, information relating to a web session being a group of a plurality of communication sessions necessary for browsing one web site, the device comprising:
at least one memory storing a computer program; and
at least one processor configured to execute the computer program to:
acquire session information on one communication session, and integrate, when time elapsed from a start time of a reference communication session to a start time of the one communication session is equal to or less than a threshold value, the one communication session into the same web session as the reference communication session;
set the threshold value, based on a predetermined probability distribution; and
determine validity of the web session by statistical testing based on statistical information relating to a configuration of the web site, and extract the web session determined as valid.

2. The communication session log analysis device according to claim 1, wherein the processor is configured to execute the computer program to extract, based on the statistical information, the web session not being a target for the statistical testing.

3. The communication session log analysis device according to claim 2, wherein the processor is configured to execute the computer program to delete the web session not being a target for the statistical testing.

4. The communication session log analysis device according to claim 1, wherein the processor is configured to execute the computer program to delete the web session determined as invalid.

5. The communication session log analysis device according to claim 1, wherein the statistical information comprises a number of pieces of data, a mean value, a standard deviation, skewness, kurtosis, a probability density function, or a cumulative distribution function, of a number of hyperlinks, a number of contents, or a content size.

6. The communication session log analysis device according to claim 1, wherein the predetermined probability distribution has a probability density function being continuous with compact support and converging to zero at a support end point.

7. A communication session log analysis method that updates, based on a communication session log, information relating to a web session being a group of a plurality of communication sessions necessary for browsing one web site, the method comprising:
setting a threshold value, based on a predetermined probability distribution;
acquiring session information on one communication session, and integrating, when time elapsed from a start time of a reference communication session to a start time of the one communication session is equal to or less than the threshold value, the one communication session into the same web session as the reference communication session; and
determining validity of the web session by statistical testing based on statistical information relating to a configuration of the web site, and extracting the web session determined as valid.

8. The communication session log analysis method according to claim 7, further comprising extracting the web session not being a target for the statistical testing, based on the statistical information.

9. The communication session log analysis method according to claim 8, further comprising deleting the web session not being a target for the statistical testing.

10. The communication session log analysis method according to claim 7, further comprising deleting the web session determined as invalid.

11. The communication session log analysis method according to claim 7, wherein the statistical information comprises a number of pieces of data, a mean value, a standard deviation, skewness, kurtosis, a probability density function, or a cumulative distribution function, of a number of hyperlinks, a number of contents, or a content size.

12. The communication session log analysis method according to claim 7, wherein the predetermined probability distribution has a probability density function being continuous with compact support and converging to zero at a support end point.

13. A non-transitory computer readable recording medium that records a communication session log analysis program causing a computer to execute processing of updating, based on a communication session log, information relating to a web session being a group of a plurality of communication sessions necessary for browsing one web site, the program causing a computer to execute:

processing of setting a threshold value, based on a predetermined probability distribution;

processing of acquiring session information on one communication session, and causing, when time elapsed from a start time of a reference communication session to a start time of the one communication session is equal to or less than the threshold value, the one communication session to belong to the same web session as the reference communication session; and processing of determining validity of the web session by statistical testing based on statistical information relating to a configuration of the web site, and extracting the web session determined as valid.

14. The non-transitory computer readable recording medium that records the communication session log analysis program according to claim 13, the program further causing to execute processing of extracting, based on the statistical information, the web session not being a target for the statistical testing.

15. The non-transitory computer readable recording medium that records the communication session log analysis program according to claim 14, the program further causing to execute processing of deleting the web session not being a target for the statistical testing.

16. The non-transitory computer readable recording medium that records the communication session log analysis program according to claim 13, the program further causing to execute processing of deleting the web session determined as invalid.

17. The non-transitory computer readable recording medium that records the communication session log analysis program according to claim 13, wherein the statistical information comprises a number of pieces of data, a mean value, a standard deviation, skewness, kurtosis, a probability density function, or a cumulative distribution function, of a number of hyperlinks, a number of contents, or a content size.

18. The non-transitory computer readable recording medium that records the communication session log analysis program according to claim 13, wherein the predetermined probability distribution has a probability density function being continuous with compact support and converging to zero at a support end point.

* * * * *